Patented Jan. 7, 1936

2,027,270

UNITED STATES PATENT OFFICE 2,027,270

CANNING OF CRAB MEAT

Carl R. Fellers, Amherst, Mass.

No Drawing. Application February 20, 1935,
Serial No. 7,355

12 Claims. (Cl. 99—11)

My invention relates to improvements in the canning of crab meat, more particularly of the meat of the so-called "blue crab" and "rock crab" and "sand crab", and includes improvements in process and an improved crab meat product.

The meat of the blue, sand or rock crabs, the common edible crabs of the Atlantic coast of the United States, is at present marketed either freshly picked or solidly frozen. It has not hitherto been successfully canned. This crab meat is extremely perishable and, under the best of conditions, with preservation attempted by refrigeration only, will safely keep not more than a few days. Recognized spoilage of course subjects the marketer to severe losses and unrecognized spoilage frequently causes serious illnesses. Uncertainty as to the quality of the meat, in the mind of the consuming public, as well as the losses involved in distribution of the meat, have, notwithstanding the high nutritive value and attractive flavor of the meat, restricted the market for this crab meat.

Such spoilage, and the consequent losses and dangers, can be effectively prevented by appropriate canning of the meat, but none of the canning processes hitherto proposed have, as applied to the blue, sand or rock crabs, avoided a discoloration of the meat destroying the market value of the canned product. The meat of other types of crab, notably the Japanese crab, has been successfully canned, but neither the processes used for the Japanese crab nor any others hitherto proposed as applicable to the blue crab, rock crab or sand crab have solved this problem which may be peculiar to the type of crab occurring on the Atlantic coast of the United States.

This discoloration which I have referred to is a change, frequently irregular through the meat, from a pleasing white to unattractive shades of gray or blue, sometimes almost to black. This color change is not always evident immediately after canning but generally occurs within a few days or weeks.

The meat and blood of the crab contain hemocyanin and possibly other compounds of copper. I have found that the meat of the blue crab contains about 25–70 parts (by weight) per million of copper. In freshly picked meat, this copper is principally if not entirely in organic combination, but these organic copper compounds are unstable and in very short periods of time, particularly at elevated temperatures, summer temperatures or higher, decompose with liberation of soluble copper compounds dissociating to form ionic copper in the presence of water.

I have discovered that the discoloration to which I have referred is due to the formation of copper-ammonia complexes by reaction between such ionic copper and ammonia liberated from proteins of the crab meat. These copper-ammonia complexes form and impart distinct discoloration even though the concentration of ionic copper be extremely low. More than sufficient ammonia for the reaction is usually liberated by any heating of the meat, by storage for short periods at summer temperatures, and by decomposition incident to bacterial action.

I have further discovered that such discoloration can be avoided by, and my invention consists essentially in, treating the crab meat, before initial discoloration, with an aqueous solution of a salt or salts of one or more of the metals, aluminum, zinc and tin, sealing the treated meat in containers and thermally sterilizing the meat in the containers after sealing without impairing the quality, with respect to human consumption, of the freshly picked crab meat. I have found salts of aluminum to be particularly advantageous in this connection. I have found mixtures of salts of two or more of these metals to be advantageous in this connection and I have found salts of zinc to be in general more useful in such mixtures than alone. I prefer to use initially soluble salts of these metals, but initially insoluble salts which become soluble, wholly or partially, during processing are also useful.

Although some discoloration can be overcome by treatment of discolored crab meat with salts of these metals, the dosage required to prevent discoloration before discoloration has begun is very much less than that required to overcome very little discoloration. Thus, in carrying out my invention, I take appropriate precautions to prevent initial discoloration of the meat before it is subjected to the treatment. I prefer to treat, seal and sterilize the meat immediately after picking, to initiate the treatment within ten minutes of picking if possible, certainly within one hour, for example, but in circumstances in which this is impractical I may refrigerate or freeze the meat immediately after picking and keep it refrigerated or frozen until I am ready to initiate the treatment. By applying the treatment before initial discoloration, I can prevent discoloration with dosages so small as to be entirely unobjectionable.

The dosage is a matter of time of treatment as well as of concentration of the metal salt or salts, and under appropriate conditions the residual concentration of the treating agent in the canned meat may be much less than the concentration of the treating agent in the treating solution or solutions. For example, the freshly picked meat may be merely dipped in an aqueous solution of aluminum, zinc or tin salts containing 400 parts per million, completed as metal, even though the meat is thoroughly drained or washed before being packed in the cans prior to sealing, or the freshly picked meat may be soaked in an aqueous solution containing 300 parts per million of aluminum or 200 parts per million of zinc for five minutes, or the freshly picked meat may be packed in a brine containing 200 parts per million of aluminum or zinc or 300 parts per million of tin. Residual concentration of the treating agent can also be reduced by dividing the application between washing or soaking solution and packing solution. For example, the freshly picked meat may be soaked for five minutes in an aqueous solution containing 200 parts per million of aluminum and packed in an aqueous solution containing 200 parts per million of aluminum, or it may be soaked for five minutes in an aqueous solution containing 100 parts per million of zinc and packed in an aqueous solution containing 50 parts per million of zinc, or it may be soaked for five minutes in an aqueous solution containing 200 parts per million of tin, and packed in an aqueous solution containing 200 parts per million of tin, the meat being drained substantially free of the soaking solution before packing in each case.

In general, these metal salts are used in concentrations, in the treating solution or solutions, of 50-500 parts per million, computed as metal. As noted, these metal salts may be applied to the crab meat in solution in a washing or soaking solution or in a packing solution or in both. Also, mixtures of salts of two or more of these metals, particularly of aluminum and zinc, may be used with advantage. For example, the treating solution may contain 250 parts of aluminum and 50 parts of zinc per million, or 50 parts of zinc and 150 parts of tin per million.

The salts of aluminum, zinc and tin useful in carrying out my invention include aluminum sulphate, sodium alum, potassium alum, aluminum chloride, aluminum citrate, aluminum nitrate, zinc chloride, zinc sulphate, zinc nitrate, stannous chloride, stannous nitrate and stannic chloride. As further illustration, treating solutions of the following concentrations may be used with advantage: aluminum from sulphate, 200-400 parts per million; zinc from nitrate or sulphate, 100 parts per million; and tin from stannous chloride, 200-400 parts per million.

The temperature to which and the period over which the canned crab meat is heated during thermal sterilization should be appropriately limited to avoid degradation of the product during this stage of the process. If the heating is either too severe or too prolonged, consequent decomposition of proteins and copper compounds may reimpart the tendency to discolor to the meat and may also liberate volatile sulphur compounds. Temperatures in excess of 240° F. should be avoided. Half pound tin cans may be sterilized, for example, by heating for 90 minutes at 222°-223° F. or for 75 minutes at 226°-227° F. or for 60 minutes at 235-236° F. In this connection, prompt cooling of the sterilized canned meat assists in conserving flavor, color and texture of the product. The sterilized canned meat is with advantage cooled to a temperature not exceeding about 120° F. within 20 minutes after sterilization is completed, for example.

My invention is applicable alike in packing crab meat in tin cans and, for example, in glass jars. In referring to "canning" I intend to refer generally to packing in sealed containers, the discoloration to which I have referred being a consequence of the nature of the crab meat rather than of the character of the receptacle.

A satisfactory fill for a one-half pound flat tin can is, for example, 6.6 ounces of crab meat and, as a packing solution, 2 ounces of a 2-3% sodium chloride brine or 2 ounces of sea water. Liners, of parchment paper for example, may be used, but I have found that the use or non-use of such liners, in application of my invention, does not affect the quality of the product.

The use of an aqueous brine, such as those just mentioned, as a packing solution is advantageous. It accelerates transfer of heat through the contents of the packed containers thus facilitating sterilization, it assists in preventing or minimizing scorching or caramelization of the canned meat during sterilization and it assists in conserving color and texture of the product. Such aqueous brine, used as a packing solution, may, with advantage, as noted, contain a salt or salts of one or more of the metals, aluminum, zinc and tin.

In circumstances such that it is impractical to initiate treatment of the crab meat immediately after picking, the meat should be washed in a refrigerated aqueous brine immediately after picking. A 2-3% solution of sodium chloride or sea water is useful in this connection. Such washing is, however, an advantageous preliminary step even though the treatment of the meat is to be initiated immediately. Such washing assists in arresting decomposition, tends to whiten the meat, improves its texture and assists in preserving the natural flavor of the freshly picked meat. Preliminary chilling of the meat, by such washing for example, also assists in minimizing disintegration of the meat into small broken or fibrous pieces. Such washing also tends to remove bacteria introduced during the handling incidental to picking.

The packed containers are, with advantage, exhausted immediately prior to sealing. This may be accomplished, for example, by mechanical evacuation or by passing the packed but unsealed containers through an exhaust box in which they are heated to a temperature such that the temperature in the center of the container reaches at least 180° F.

The formation of ammonia may be further suppressed, in applying my invention, by adding a weak organic acid such as citric acid, lactic acid, maleic acid or tartaric acid to the washing or soaking solution or to the packing solution in proportion such that it is present in the solution in a concentration approximating 0.03-0.1% (by weight). Such use of a weak organic acid also tends to reduce the severity of the thermal treatment required for sterilization, thus assisting in maximum conservation of flavor, color and texture.

I claim:

1. In the canning of meat from the "blue crab", "rock crab" or "sand crab", the improvement which comprises subjecting the meat to treatment, before initial discoloration, with an aqueous solution of a salt of the class of metals consisting of aluminum, zinc and tin, the concentration of said solution being such as to contain 50 to 500 parts per million, computed as metal, of said salt, sealing the treated meat in containers, and thermally sterilizing the meat in the containers after sealing.

2. In the canning of meat from the "blue crab", "rock crab" or "sand crab", the improvement which comprises subjecting the meat to treatment, before initial discoloration, with an aqueous solution of at least two salts of the class of metals consisting of aluminum, zinc and tin, the concentration of said solution being such as to contain 50 to 500 parts per million, computed as metal, of said salts, sealing the treated meat in containers, and thermally sterilizing the meat in the containers after sealing.

3. In the canning of meat from the "blue crab", "rock crab" or "sand crab", the improvement which comprises subjecting the meat to treatment, before initial discoloration, with an aqueous solution of an aluminum salt, the concentration of said solution being such as to contain 50 to 500 parts per million, computed as metal, of said salt, sealing the treated meat in containers, and thermally sterilizing the meat in the containers after sealing.

4. In the canning of meat from the "blue crab", "rock crab" or sand crab", the improvement which comprises subjecting the meat to treatment, before initial discoloration, with an aqueous solution of an aluminum salt and a zinc salt, the concentration of said solution being such as to contain 50 to 500 parts per million, computed as metal, of said salts, sealing the treated meat in containers, and thermally sterilizing the meat in the containers after sealing.

5. In the canning of meat from the "blue crab", "rock crab" or "sand crab", the improvement which comprises subjecting the meat to treatment, before initial discoloration, with an aqueous solution of a salt of the class of metals consisting of aluminum, zinc and tin, the concentration of said solution being such as to contain 50 to 500 parts per million, computed as metal, of said salt, sealing the treated meat in containers, thermally sterilizing the meat in the containers after sealing by heating to a temperature not exceeding about 240° F.

6. In the canning of meat from the "blue crab", "rock crab" or "sand crab", the improvement which comprises, washing the meat in a refrigerated aqueous brine, subjecting the washed meat to treatment, before initial discoloration, with an aqueous solution of a salt of the class of metals consisting of aluminum, zinc and tin, the concentration of said solution being such as to contain 50 to 500 parts per million, computed as metal, of said salt, sealing the treated meat in containers, and thermally sterilizing the meat in the containers after sealing.

7. In the canning of meat from the "blue crab", "rock crab" or "sand crab", the improvement which comprises, subjecting the meat to treatment, before initial discoloration, with an aqueous solution of a salt of the class of metals consisting of aluminum, zinc and tin and with a weak organic acid, the concentration of said solution being such as to contain 50 to 500 parts per million, computed as metal, of said salt, sealing the treated meat in containers, and thermally sterilizing the meat in the containers after sealing.

8. A canned meat product substantially free from discoloration comprising meat from the "blue crab", "rock crab" or "sand crab" in an aqueous brine containing a salt of the class of metals consisting of aluminum, zinc and tin, the concentration of said brine being such as to contain 50 to 500 parts per million, computed as metal, of said salt.

9. A canned meat product substantially free from discoloration comprising meat from the "blue crab", "rock crab" or "sand crab" in an aqueous brine containing at least two salts of the class of metals consisting of aluminum, zinc and tin, the concentration of said brine being such as to contain 50 to 500 parts per million, computed as metal, of said salts.

10. A canned meat product substantially free from discoloration comprising meat from the "blue crab", "rock crab" or "sand crab" in an aqueous brine containing a salt of aluminum, the concentration of said brine being such as to contain 50 to 500 parts per million, computed as metal, of said salt.

11. A canned meat product substantially free from discoloration comprising meat from the "blue crab", "rock crab" or "sand crab" in an aqueous brine containing a salt of aluminum and a salt of zinc, the concentration of said brine being such as to contain 50 to 500 parts per million, computed as metal, of said salts.

12. A canned meat product substantially free from discoloration comprising meat from the "blue crab", "rock crab" or "sand crab" in an aqueous brine containing a salt of the class of metals consisting of aluminum, zinc and tin, the concentration of said brine being such as to contain 50 to 500 parts per million, computed as metal, of said salt, and a small proportion of a weak organic acid.

CARL R. FELLERS.